US 6,296,733 B1

(12) United States Patent
Hudkins et al.

(10) Patent No.: US 6,296,733 B1
(45) Date of Patent: Oct. 2, 2001

(54) FLOOR MATS AND METHOD OF MAKING SAME

(75) Inventors: Patrick E. Hudkins, Monroe Falls; Mark W. Thompson, Harrisburg; Steven P. Hammond, Shippensburg, all of PA (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/203,138

(22) Filed: Dec. 1, 1998

(51) Int. Cl.[7] .................................................. B29C 43/00
(52) U.S. Cl. ........................ 156/245; 156/312; 264/243; 264/322; 264/327
(58) Field of Search .................... 156/244.25, 244.27, 156/245, 285, 222, 312, 242; 264/243, 257, 327, 324, 322, 167, 171.1, 171.13, 173.1, 177.1, 177.17, 210.2

(56) References Cited

U.S. PATENT DOCUMENTS

| | | |
|---|---|---|
| 3,192,589 * | 7/1965 | Pearson . |
| 4,361,925 | 12/1982 | Yamamoto et al. . |
| 4,804,567 * | 2/1989 | Reuben ................................... 428/40 |
| 4,968,548 | 11/1990 | Gibson et al. . |
| 4,979,772 | 12/1990 | Carey et al. . |
| 4,984,838 | 1/1991 | Kim . |
| 5,034,258 * | 7/1991 | Grace ...................................... 428/78 |
| 5,136,771 * | 8/1992 | Lang ....................................... 29/450 |
| 5,154,961 * | 10/1992 | Reuben ................................... 428/82 |
| 5,171,619 * | 12/1992 | Reuben ................................... 428/95 |
| 5,215,348 | 6/1993 | Wen-Hwang . |
| 5,242,646 * | 9/1993 | Torigoe et al. ....................... 264/219 |
| 5,358,768 | 10/1994 | Wiley, III . |
| 5,518,795 * | 5/1996 | Kennedy et al. .................... 428/100 |
| 5,554,333 * | 9/1996 | Fujiki . |
| 5,945,131 * | 8/1999 | Harvey et al. ........................ 425/141 |
| 6,022,503 * | 2/2000 | Hudkins et al. ..................... 264/243 |
| 6,035,498 * | 3/2000 | Buzzell et al. ......................... 24/452 |

FOREIGN PATENT DOCUMENTS

WO 82/02480 * 8/1982 (WO) .
WO 94/23610 * 10/1994 (WO) .
WO 98/30381 * 7/1998 (WO) .

* cited by examiner

Primary Examiner—Jan H. Silbaugh
Assistant Examiner—Mark Eashoo
(74) Attorney, Agent, or Firm—Brooks & Kushman PC

(57) ABSTRACT

A floor mat for covering a motor vehicle flooring system having a plurality of fibers is disclosed. The floor mat includes a thermoplastic layer having first and second surfaces and a plurality of projections extending from the second surface. Each of the projections includes an elongated body portion and an enlarged tip for engaging the fibers. A method of making such floor mats is also disclosed.

28 Claims, 5 Drawing Sheets

FLOOR MATS AND METHOD OF MAKING SAME

TECHNICAL FIELD

The invention relates to floor covering systems, such as floor mats, having a plurality of projections extending from the underside thereof to enhance the stability of the mats when placed on a carpeted surface such as a carpeted floor of an automobile. The invention further relates to a method of making such floor covering systems.

BACKGROUND ART

Floor carpets are in common use in homes, businesses and transportation vehicles such as automobiles, buses, trains, aircrafts and marine crafts. It is common for certain areas of such carpets to receive substantially more foot traffic and, thus, more wear as compared with other areas. In order to accommodate such uneven wear, floor coverings such as floor mats are frequently placed on such carpets in high traffic areas. A common problem in the use of floor mats, however, is the tendency of the floor mats to slip on the underlying carpet. To minimize the slippage of floor mats on, for example, cut-loop pile carpets in automobiles, floor mats have been designed with a plurality of downwardly extending cone-shaped projections known as "bristles," "nubs," or "nibs." Such cone-shaped projections typically have maximum diameters in the range of 2.5 to 6 millimeters (mm), and minimum diameters in the range of 1.5 to 2 mm. Furthermore, the density of such projections is typically in the range of 8 to 13 projections per square inch. Efforts by automotive manufacturers to reduce weight and cost of their products, however, have resulted in a shift away from cut-loop pile for floor carpet constructions to lighter-weight, less costly non-woven needle punched constructions.

Other known means of minimizing slippage of a floor mat include attaching mating fastening means to the underside of the floor mat and the top surface of a particular floor carpet. U.S. Pat. No. 4,968,548, for example, discloses a removable floor cover having a plurality of one of the elements of a hook and loop fastening system attached thereto, for use with a floor surface having a plurality of the other elements of a hook and loop fastening system attached thereto. Because of the high cost of hook and loop fastening systems and the additional labor required to attach the fastening elements to both the cover layer and the floor surface, this design is relatively costly to manufacture and install.

SUMMARY OF THE INVENTION

The present invention overcomes the shortcomings of the prior art by providing a low cost floor covering, such as a floor mat, that effectively minimizes slippage on carpeted floor surfaces, and functions especially well on non-woven, needle punched carpets. Furthermore, a method for manufacturing such a floor covering is also provided.

A floor mat according to the invention for covering a motor vehicle flooring system having a plurality of fibers comprises a thermoplastic layer having first and second surfaces and a plurality of projections extending from the second surface. Each of the projections includes an elongated body portion and an enlarged tip for engaging the fibers.

In one embodiment of the invention, the tips are button-shaped and function as one of the elements of a fastening system. Advantageously, such a configuration grips especially well to a carpet having a non-woven, needle punched construction. Such a carpet functions as the other element of the fastening system.

The method according to the invention of making a removable floor covering for covering a flooring system comprises forming a thermoplastic layer having first and second surfaces and at least one projection extending from the second surface, the at least one projection having an elongated body portion and an enlarged tip that is engageable with the flooring system.

A more specific expression of the method according to the invention of making a removable floor covering for covering a flooring system comprises forming a thermoplastic layer having first and second surfaces and at least one projection extending from the second surface, the projection having an elongated body portion. The method further includes heating the at least one projection to sufficiently soften the at least one projection, and compressing the thermoplastic layer sufficiently so as to form an enlarged tip on the at least one projection, the enlarged tip being engageable with the flooring system.

The at least one projection is preferably heated by positioning the projection adjacent to and in heat transfer relationship with a heated surface. Furthermore, the compressing step preferably involves compressing the at least one projection against the heated surface.

According to one aspect of the invention, the heated surface is a thermally regulated platen. According to another aspect of the invention, the heated surface is a thermally regulated roller. Such surfaces provide a cost-effective and efficient means for forming the enlarged tip.

While an exemplary floor covering and method for making the same are illustrated and disclosed, such disclosure should not be constructed to limit the claims. It is anticipated that various modifications and alternative designs may be made without departing from the scope of the invention.

BEST MODES FOR CARRYING OUT THE INVENTION

Figure 1:
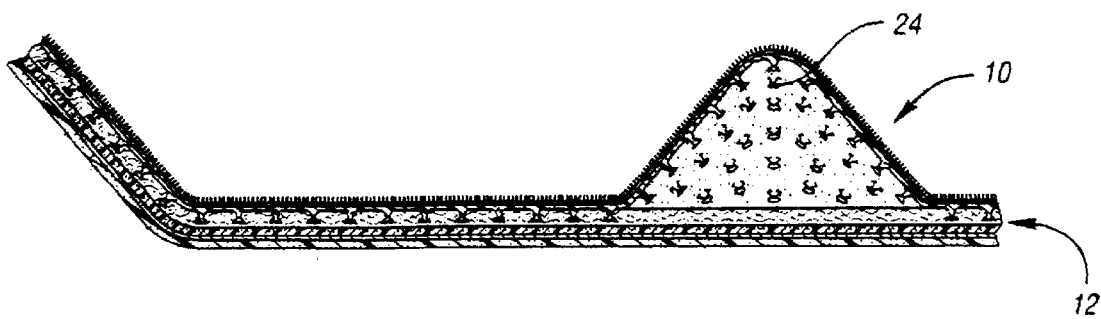
FIG. 1 is a cross-sectional view of a floor mat according to the invention installed on a floor carpet system of a motor vehicle, with a portion of the floor mat pulled away from the floor carpet system to show a plurality of projections extending from the floor mat.
Figure 2:
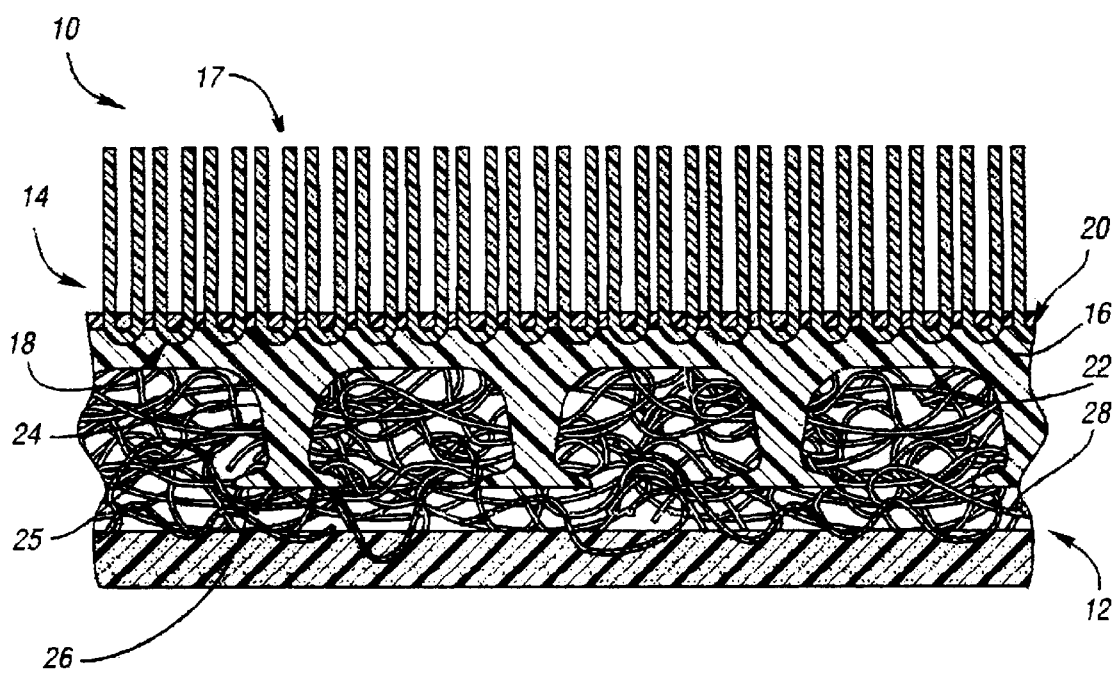
FIG. 2 is an enlarged cross-sectional view of a portion of the floor mat installed on the floor carpet system, and showing the projections with elongated body portions and enlarged tips.
Figure 3:
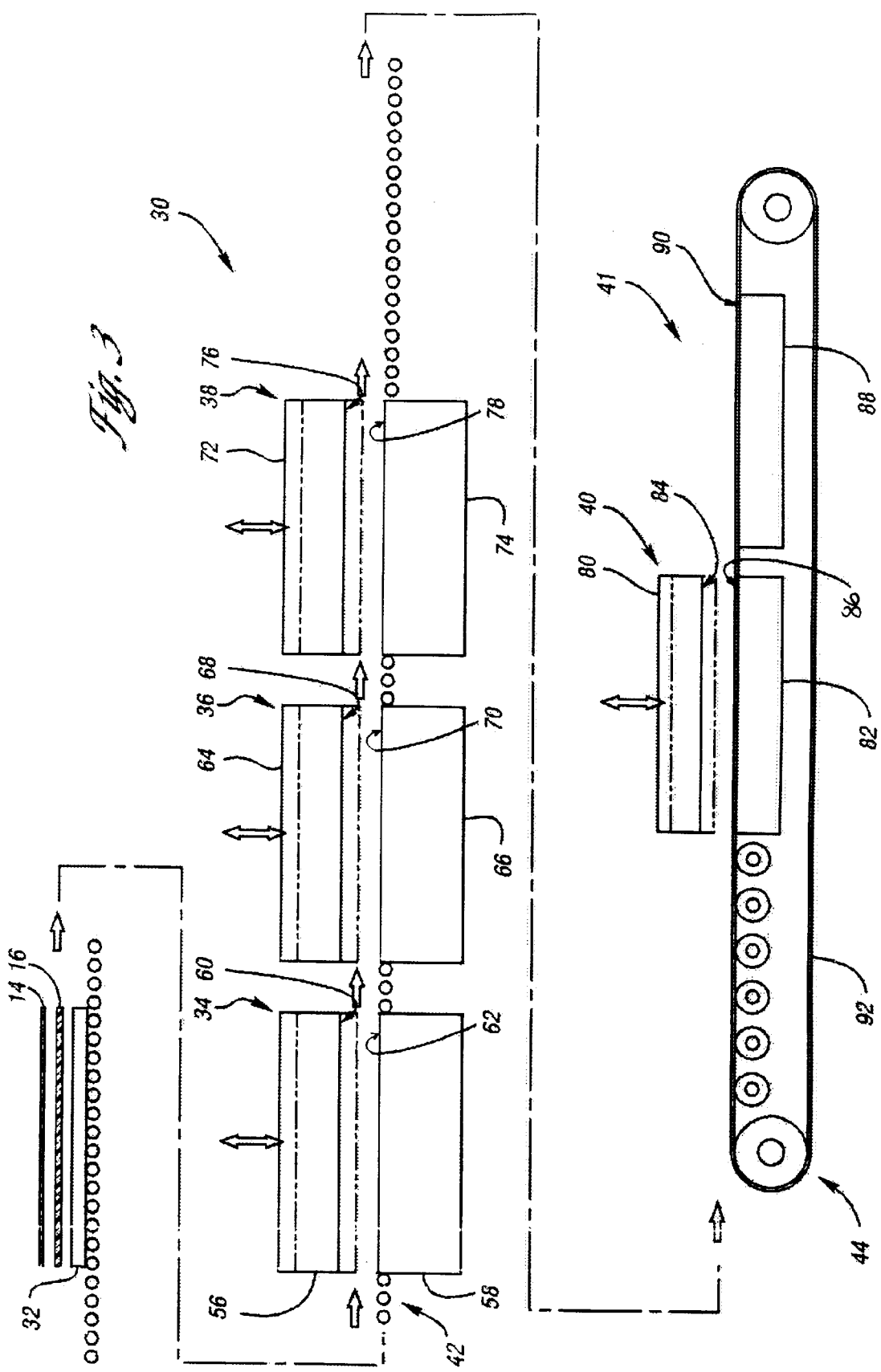
FIG. 3 is a schematic view of an apparatus for practicing a method according to the invention for making floor mats according to the invention, the apparatus including a mold and first, second, third and fourth presses.

With reference to the drawings, the preferred embodiments of the invention will be described. FIGS. 1 and 2 show a floor covering member such as a floor mat 10 according to the invention installed on a floor carpet system 12 of a motor vehicle. The floor mat 10 includes a cover layer 14 attached to a thermoplastic layer 16. The cover layer 14 has an appearance portion 17 and a back portion 18, and may comprise any suitable material such as woven, non-woven, or tufted carpet provided with or without a backing layer. Preferably, the cover layer 14 comprises a thermoplastic material that is recyclable with the thermoplastic layer 16. Alternatively, the cover layer 14 may be eliminated if not required for a particular application. The thermoplastic layer 16 has first and second surfaces 20 and 22, respectively, and a plurality of integrally formed projections 24 having preferably cone-shaped body portions 25 and enlarged, preferably button-shaped tips 26. The density of such projections 24 may vary depending on the application, but is preferably in the range of 20 to 50 projections 24 per square inch.

The tips 26 improve the gripping strength of the floor mat 10 on the floor carpet system 12 by engaging fibers within the floor carpet system 12. The floor mat 10 grips especially well to a floor carpet system 12 comprising non-woven, needle-punched and randomly oriented fibers 28 as shown in FIG. 2. As the projections 24 are inserted into such a floor carpet system 12, the randomly oriented fibers 28 surround the tips 26, thereby securing the floor mat 10 to the floor carpet system 12. In other words, the tips 26 function as one of the elements of a fastening system, and the fibers 28 function as the other element for receiving and engaging the tips 26. As more pressure is applied to the floor mat assembly 10, the projections 24 extend deeper into the floor system 12, and more fibers 28 become sandwiched between the tips 26 and the second surface 22 of the floor mat 10, thereby improving the gripping or fastening strength of the floor mat 10 on the floor system 12.

Each body portion 25 is preferably relatively fine to facilitate insertion of the projections 24 into the floor carpet system 12. Each body portion 25 also preferably tapers from a maximum diameter adjacent the second surface 22 to a minimum diameter adjacent a respective tip 26. The maximum diameter of each body portion 25 is preferably in the range of 1.2 to 2.5 millimeters (mm), and the minimum diameter of each body portion 25 is preferably in the range of 0.5 to 1.5 mm. In addition, the length of each body portion 25 is preferably in the range of 1.5 to 2 mm. Such a configuration of the body portion 25 may be referred to as a micro-nib. Furthermore, each tip 26 preferably has a diameter in the range of 1 to 2.5 mm. Alternatively, the projections 24 may have any suitable configuration such that each projection 24 preferably includes an elongated body portion and an enlarged tip having a diameter or width that is larger than the diameter or width of a respective body portion adjacent the tip. Such a projection configuration may be referred to as a mushroom-nib or a button-nib. As yet another alternative, the enlarged tips 26 may be eliminated from the projections 24 if not required for a particular application. For example, it has been discovered that a floor mat having a micro-nib configuration alone grips well on a floor carpet system comprising cut loop or loop pile fibers. Each micro-nib in such a configuration preferably has a length in the range of 3 to 4 mm.

Figure 4:
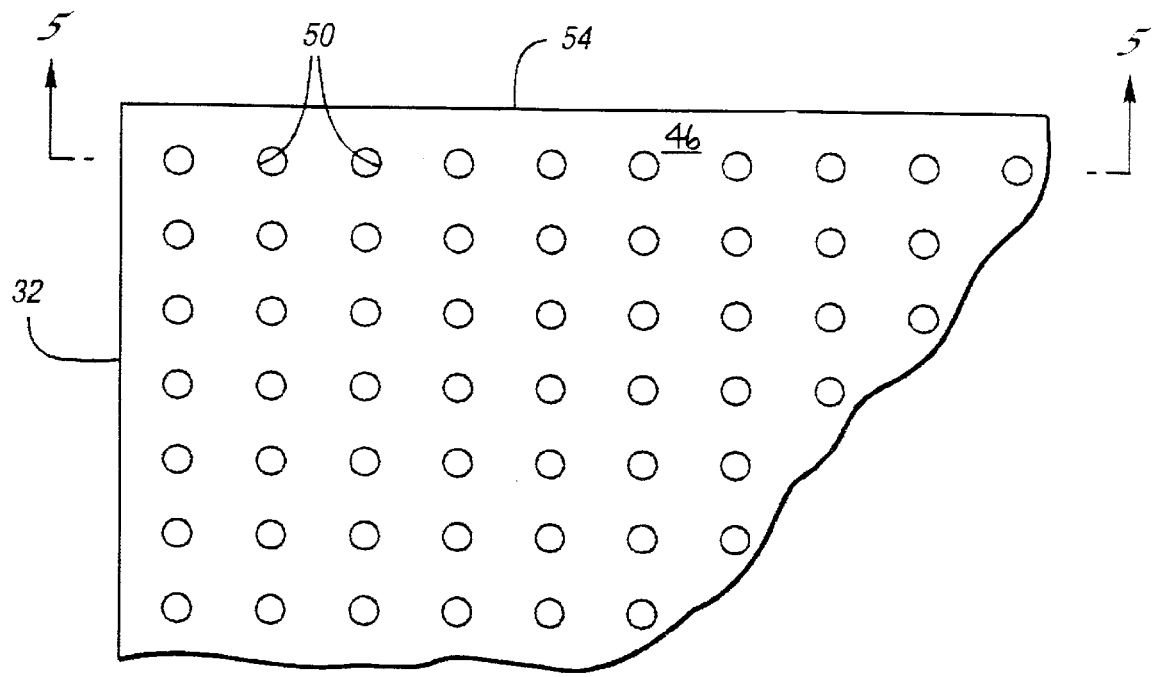
FIG. 4 is a top view of a portion of the mold showing a plurality of cavities for forming the elongated body portions of the floor mat projections.
Figure 5:
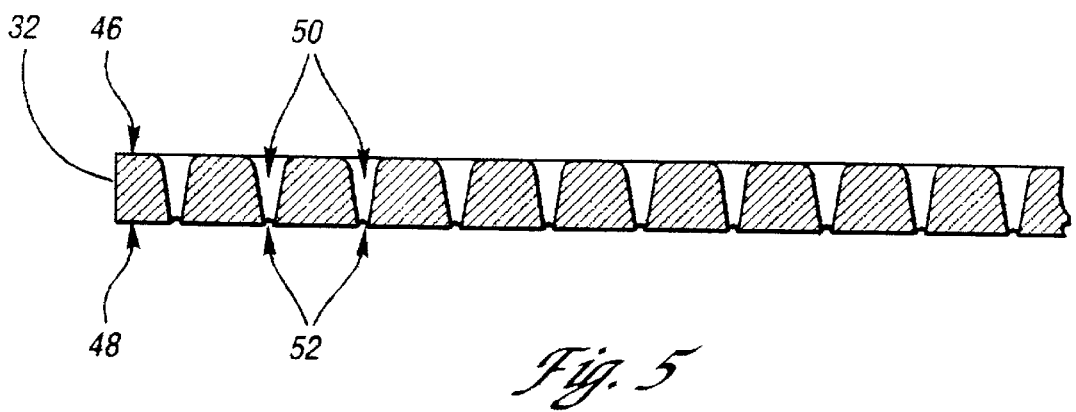
FIG. 5 is a cross-sectional view of a portion of the mold taken along line 5—5 of FIG. 4 and viewed in the direction of the arrows.

FIGS. 3 through 7 show an apparatus 30 used to make the floor mat 10. The apparatus includes a mold 32; first, second, third and fourth presses 34, 36, 38 and 40, respectively; a cooling station 41; and first and second conveyor systems 42 and 44, respectively. The mold 32 preferably comprises metal such as an aluminum alloy, but it may be made of any suitable material or materials having sufficient heat conductivity such that heat may be transferred readily therethrough. As shown in FIGS. 4 and 5, the mold 32 has a top or first surface 46, a bottom or second surface 48, and a plurality of cavities 50 that are preferably frusto-conical in shape for forming the body portions 25. Alternatively, the cavities 50 may have suitable shape and may be arranged in any desired pattern and/or density depending on, among other things, the particular end use of the floor mat to be constructed. Fluid escape passages such as fluid channels 52 extend between the cavities 50 and the second mold surface 48 for allowing air and/or other fluids in the cavities 50 to escape therefrom. The channels 52 are preferably in fluid communication with adjacent cavities 50, and extend to a peripheral edge 54 of the mold 32.

Alternatively, the fluid escape passages may have any suitable configuration sufficient to relieve pressure from the cavities 50 such as relatively small, interconnected and/or overlapping indentations, hollows, notches, and or cavities (hereinafter referred to for convenience as "indentations") that form a passageway matrix. Such a matrix is preferably formed in the second surface 48 of the mold 32, but alternatively or supplementally may be formed in a surface of a platen that supports the mold 32. A preferred method of forming such a matrix is to use fluid abrasive/impingement techniques, such as sand blasting, to create a large number of indentations in the appropriate surface. Such a configuration enables the fluid escape passages to perform the desired pressure relief function while minimizing the depth of the indentations. Minimizing the depth of the indentations helps to ensure that the cavities 50 are substantially filled with thermoplastic material at the time the material reaches entrances to the fluid escape passages. Furthermore, while the interconnected/overlapped matrix is sufficient to permit egress of air, thermoplastic material encounters a relatively high degree of resistance to flow into such a matrix configuration. As a result, a mold having such a matrix configuration has been found to regularly produce precisely formed, high quality body portions 25.

The first and second presses 34 and 36 are used to heat a sufficient portion of the thermoplastic layer 16 to the molding temperature of the particular thermoplastic material. As used herein, the term "molding temperature" refers to the temperature at which the thermoplastic material has softened sufficiently to flow upon application of compressive force. The first press 34 includes first and second platens 56 and 58, respectively, for compressing the cover layer 14, the thermoplastic layer 16 and the mold 32 therebetween. The first platen 56 is preferably thermally regulated so as to have a relatively cool surface 60 for controlling the temperature of the cover layer 14, if used, to thereby minimize deleterious effects on the cover layer 14, such as flattening and/or discoloration of fibers, as the thermoplastic layer 16 is being heated. The first platen 56 may be thermally regulated in any suitable manner known in the art including circulating fluid, such as water, therein. The desired temperature to which the surface 60 is cooled is preferably in the range of 4.4 to 48.9° C. (40 to 120° F.), but will vary according to, among other things, the type of material of the cover layer 14 and the length of time the cover layer 14 will be in contact with the surface 60. The second platen 58 is preferably thermally regulated so as to have a relatively hot surface 62 for engaging and heating the mold 32 to thereby heat the thermoplastic layer 16. The means for thermally regulating the second platen 58 may be any suitable means known in the art such as by conduction using heated liquids, vapors and/or an electric heat source. The desired temperature to which the surface 62 is heated is preferably in the range of 121.1 to 260° C. (250 to 500° F.), but will vary according to, among other things, the thermoplastic material to be heated, the thickness and heat conductivity of the mold 32, the length of time in which the mold 32 will be in contact with the hot surface 62, and the compressive force utilized to ensure effective heat transfer between the surface 62 and the mold 32.

The second press 36 also has first and second platens 64 and 66, respectively, for compressing the cover layer 14, the thermoplastic layer 16 and the mold 32 therebetween. Similar to the first press 34, the first platen 64 is preferably thermally regulated in any suitable manner so as to have a relatively cool surface 68, having a temperature preferably in the range of 4.4 to 48.9° C. (40 to 120° F.), for engaging the cover layer 14, if used. Furthermore, the second platen 66 is preferably thermally regulated in any suitable manner so as to have a relatively hot surface 70, having a temperature preferably in the range of 121.1 to 260° C. (250 to 500° F.), for engaging and heating the mold 32 to thereby further heat the thermoplastic layer 16. Alternatively, the apparatus 30 may be provided with one or more presses having heated platens to heat the thermoplastic layer 16, or the thermoplastic layer 16 may be heated in any suitable manner such as by introducing heated fluid about the thermoplastic layer 16.

The third press 38 also has first and second platens 72 and 74, respectively, for compressing the cover layer 14, the thermoplastic layer 16 and the mold 32 therebetween to form the body portions 25 of the projections 24. Similar to the first and second presses 34 and 36, the first platen 72 is preferably thermally regulated in any suitable manner so as to have a relatively cool surface 76, having a temperature preferably in the range of 4.4 to 48.9° C. (40 to 120° F.), for engaging the cover layer 14, if used. Unlike the first and second presses 34 and 36, however, the second platen 74 is preferably thermally regulated in any suitable manner so as to have a relatively cool surface 78, having a temperature preferably in the range of 4.4 to 48.9° C. (40 to 120° F.), for engaging and cooling the mold 32. The fourth press 40 includes first and second platens 80 and 82, respectively, for compressing the cover layer 14 and the thermoplastic layer 16 therebetween to thereby form the enlarged tips 26 of the projections 24. Again the first platen 80 is preferably thermally regulated in any suitable manner so as to have a relatively cool surface 84, having a temperature preferably in the range of 4.4 to 48.9° C. (40 to 120° F.), for engaging the cover layer 14, if used. The second platen 82 is thermally regulated in any suitable manner so as to have a relatively hot surface 86 having a temperature sufficient to soften a sufficient portion of the projections 24. The temperature to which the surface 86 is heated is preferably in the range of 121.1 to 204.4° C. (250 to 400° F.). The cooling station 41 preferably includes a platen 88 that is thermally regulated so as to have a relatively cool surface 90 having a temperature sufficient to cool and solidify the projections 24. The temperature to which the surface 90 is cooled is preferably in the range of 4.4 to 48.9° C. (40 to 120° F.).

The first conveyor system 42 is used to transport the mold 32 between the first, second and third presses 34, 36 and 38. The second conveyor system 44 is used to transport the cover layer 14 and the thermoplastic layer 16 between the fourth press 40 and the cooling station 41, and preferably includes a continuous belt 92. The belt 92 preferably comprises TEFLON™ so that it is sufficiently non-sticking, and is configured so that heat may be sufficiently transferred therethrough. Alternatively, the belt 92 may comprise any other suitable sufficiently non-sticking material such as silicone.

The method according to the invention involves positioning the cover layer 14, if used, and the thermoplastic layer 16 on the mold 32, and transferring the mold 32 in any suitable manner, such as by the first conveyor system 42, to the first press 34. The first platen 56 of the first press 34 is then moved downwardly to a press position, as indicated in phantom in FIG. 3, to compress the thermoplastic layer 16 against the mold 32, and to compress the mold 32 against the second platen 58. This allows heat to transfer from the second platen 58 to the mold 32, and from the mold 32 to the thermoplastic layer 16 thereby heating the thermoplastic layer 16. The compression force applied by the first platen 56 is preferably sufficient to ensure intimate contact between the mold 32 and the second platen 58, and between the thermoplastic layer 16 and the mold 32 to facilitate heat transfer between the various components. The compression force applied by the first platen 56, however, is preferably not sufficient to cause substantial flow of thermoplastic material into the cavities 50. Preferably, the compressive force applied by the first platen 56 is in the range of 0.7 to 3.5 kilograms per square centimeter (kg./cm$^2$) or 10 to 50 pounds per square inch (psi). After a sufficient portion of the thermoplastic layer 16 has been heated to a first desired temperature, the first platen 56 is moved upwardly.

Next, the mold 32 is transported via the first conveyor system 42 to the second press 36. The first platen 64 of the second press 36 is then moved downwardly to a press position, as indicated in phantom in FIG. 3, to compress the thermoplastic layer 16 against the mold 32, and to compress the mold 32 against the second platen 66. A sufficient portion of the thermoplastic layer 16 is then heated to a second desired temperature, which is at least the molding temperature of the particular thermoplastic material. Again, the compression force applied by the first platen 64 is not sufficient to cause substantial flow of thermoplastic material into the cavities 50, and is preferably in the range of 0.7 to 3.5 kg./cm$^2$ (10 to 50 psi). The second platen 66 is then moved upwardly, and the mold 32 is transferred by suitable means such as the first conveyor system 42 to the third press 38.

Figure 6:
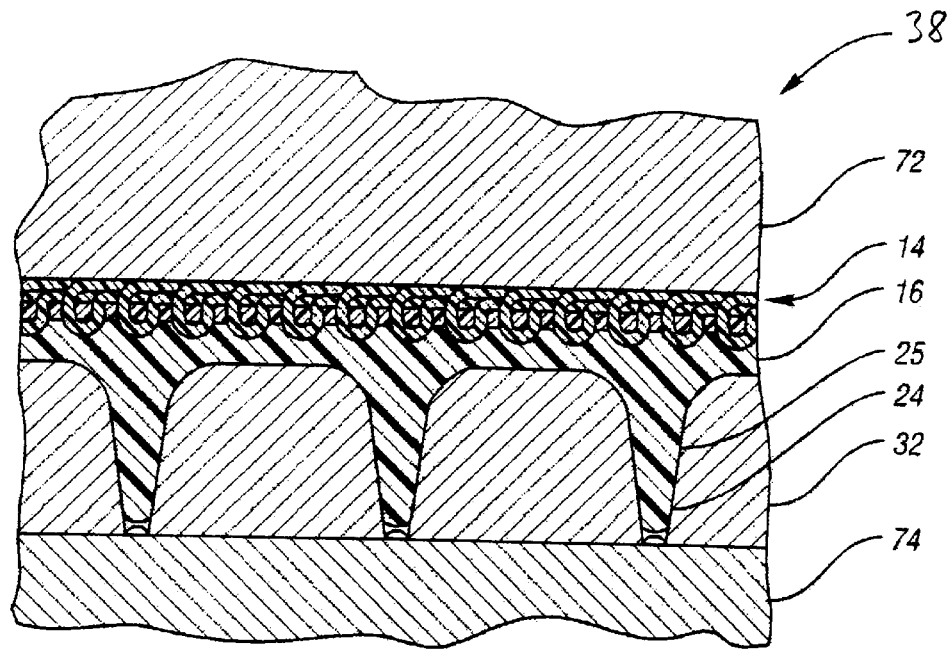
FIG. 6 is an enlarged fragmentary view of the third press, the floor mat components and the mold.

Next, the first platen 72 of the third press 38 is moved downwardly to sufficiently compress the thermoplastic layer 16 against the mold 32 to form or mold the elongated body portions 25 as shown in FIG. 6. The compressive force applied by the first platen 72 will vary depending on the application, but is preferably in the range of 3.5 to 12.6 kg./cm$^2$(50 to 180 psi). During this compression step, air exits from the cavities 50 into the channels 52 or other fluid escape passages. Furthermore, the mold 32 is also forced against the second platen 74 such that heat is transferred from the second surface 48 of the mold 32 to the second platen 74, thereby inducing a temperature gradient in the mold 32. Such a temperature gradient, which is referred to hereinafter as a "negative temperature gradient," allows the first surface 46 of the mold 32 to remain substantially at the molding temperature during initiation of the molding step. Thus, the thermoplastic material is able to readily flow into the cavities 50 without any substantial detrimental impact from the cooling that occurs through the second surface 48 of the mold 32. On the other hand, the existence of such negative temperature gradient is highly beneficial from the standpoint of preventing flow of the thermoplastic material into the channels 52 or other fluid escape passages. At the time the thermoplastic material reaches the entrances to the channels 52, the temperature of the mold 32 in the region of the entrances is preferably below the molding temperature of the thermoplastic material, and more preferably at least 11.1° C. (20° F.) below the molding temperature of the thermoplastic material. Additional details regarding the process of forming the body portions 25, and additional details regarding the portion of the apparatus 30 used to form the body portions 25 are disclosed in U.S. Pat. No. 6,022,503, assigned to the assignee of the present invention and hereby incorporated by reference. Alternatively, the body portions 25 may be formed using any suitable method such as injection molding, vacuum molding, or compression molding, or any combination thereof. Furthermore, the cover layer 14 may be subsequently attached to a preformed thermoplastic layer 16, or the cover layer 14 may be eliminated if not required for a particular application.

Figure 7:
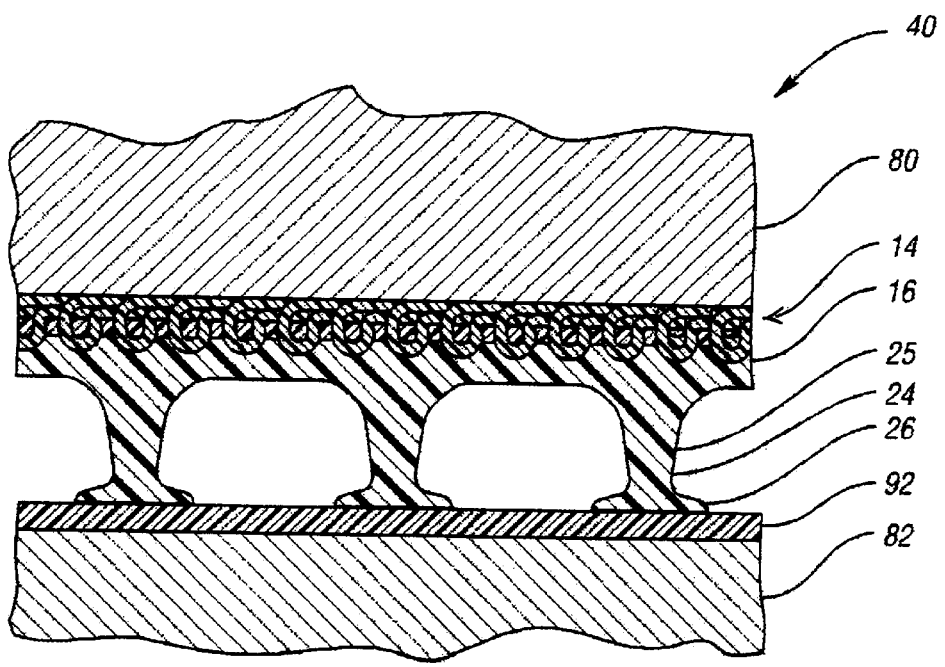
FIG. 7 is an enlarged fragmentary view of the fourth press and the floor mat components.

Next, the cover layer 14 and the thermoplastic layer 16 are stripped from the mold 32 and are placed on the belt 92 such that the body portions 25 are in contact with the belt 92. The cover layer 14 and the thermoplastic layer 16 are then transferred by the belt 92 to the fourth press 40. Heat from the second platen 82 then transfers through the belt 92 to the body portions 25, thereby softening the body portions 25. Alternatively, heated fluid such as air may be introduced about the thermoplastic layer 16 to soften the body portions 25. The first platen 80 is then moved downwardly to a predetermined distance above the second platen 82 to compress the thermoplastic layer 16 against the belt 92 and the second platen 82, thereby forming the enlarged tips 26 as shown in FIG. 7. The compressive force applied by the first platen 80 is preferably in the range of 0.07 to 0.7 kg/cm$^2$ (1 to 10 psi). Next, the cover layer 14 and the thermoplastic layer 16 are transferred by the belt 92 to the cooling station 41. Heat then transfers from the projections 24 and the belt 92 to the platen 88, thereby sufficiently cooling and solidifying the projections 24. Alternatively, other cooling means, such as air cooling, may be used to sufficiently cool the projections 24. Finally, the cover layer 14 and thermoplastic layer 16 may be trimmed as required to form the final floor mat 10.

Because the projections 24 are integrally formed on the floor mat 10, no additional fastening system is required on either the floor mat 10 and/or the carpet system on which the floor mat 10 is used. Consequently, the method according to the invention involves fewer steps and less cost as compared with prior art methods of making floor mats having hook and loop type fastening systems such as VELCRO™. Furthermore, the floor mat 10 produced by the method provides superior resistance to slippage on non-woven, needle punched carpets as compared with prior art floor mats having standard bristles, nubs or nibs.

Figure 8:
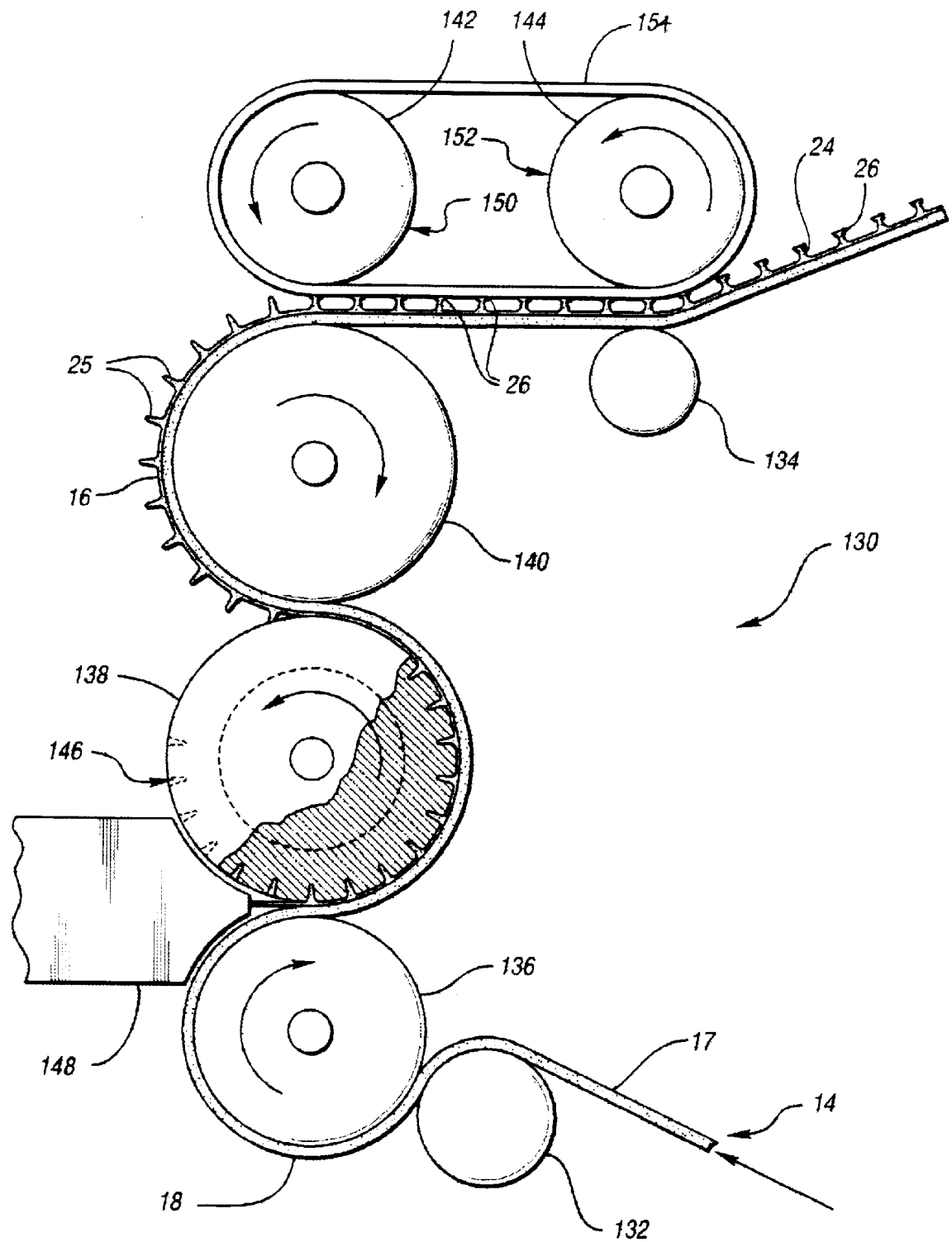
FIG. 8 is a schematic view of a second embodiment of the apparatus for practicing the method according to the invention.

FIG. 8 shows a second embodiment 130 of the apparatus for forming floor coverings such as floor mats 10. The apparatus 130 includes first and second guide members 132 and 134, respectively, and first, second, third, fourth and fifth rotating members such as rollers 136, 138, 140, 142 and 144, respectively. The second roller 138 may be referred to as an embossing roller and has a plurality of cavities 146 for forming the body portions 25 of the projections 24. An extruder 148 is disposed between the first and second rollers 136 and 138, respectively, for introducing thermoplastic material between the rollers 136 and 138. The fourth roller 142 is preferably thermally regulated in any suitable manner so as to have a heated surface 150, and the fifth roller 144 is preferably thermally regulated in any suitable manner so as to have a relatively cooler surface 152. A belt 154, which is similar to the belt 92, surrounds the fourth and fifth rollers 142 and 144, respectively.

The method of making floor mats 10 with the apparatus 130 includes feeding the cover layer 14, which is preferably a continuous layer, between the first guide member 132 and the first roller 136 such that the appearance portion 17 of the cover layer 14 contacts the first roller 136, and the back portion 18 is exposed. Next, thermoplastic material is extruded onto the back portion 18 by the extruder 148. The thermoplastic material and the cover layer 14 are then compressed between the first and second rollers 136 and 138 so as to form the thermoplastic layer 16 having the body portions 25 of the projections 24, and to attach the thermoplastic layer 16 to the cover layer 14. The method continues by feeding the cover layer 14 and the thermoplastic layer 16 onto the third roller 140 such that the body portions 25 are exposed. Next, the cover layer 14 and the thermoplastic layer 16 are compressed between the third and fourth rollers 140 and 142, respectively, to form the tips 26. Heat from the heated surface 150 transfers through the belt 154 to soften the body portions 25 to thereby facilitate formation of the tips 26. Alternatively, heated fluid such as air may be introduced about the thermoplastic layer 16 to soften the body portions 25. The cover layer 14 and the thermoplastic layer 16 are then fed between the guide member 134 and the fifth roller 144, with the projections 24 in heat transfer relationship with the fifth roller 144, so as to solidify the projections 24. The cover layer 14 and the thermoplastic layer 16 may then be trimmed as needed to form the final floor mats 10.

The invention has been described in an illustrative manner, and it is to be understood that the terminology which has been used is intended to be in the nature of words of description rather than of limitation. Obviously, many modifications and variations of the invention are possible in light of the above teachings. For example, the thermoplastic layer 16 including projections 24 having body portions 25 and enlarged tips 26 may be formed in any suitable manner, including compression molding or injection molding using a suitable thermoplastic material, such as a thermoplastic elastomer, which is capable of being extracted from a mold without significant deleterious impact on the projections 24. It is, therefore, to be understood that within the scope of the appended claims, the invention may be practiced otherwise than as specifically described.

What is claimed is:

1. A method of making a floor mat, the method comprising:

positioning a thermoplastic layer on a mold having a plurality of cavities for forming projections on the thermoplastic layer;

positioning a cover layer over the thermoplastic layer;

forcing the cover layer and the thermoplastic layer against the mold to bond the thermoplastic layer and the cover layer together and to form a plurality of projections on the thermoplastic layer, each of the projections having an elongated body portion;

positioning the thermoplastic layer and the cover layer between first and second platens of a press with the projections in heat transfer relationship with a heated surface of the second platen;

allowing heat from the heated surface to sufficiently soften the projections;

compressing the cover layer and the thermoplastic layer between the first and second platens so as form enlarged tips on the projections; and positioning the cover layer and the thermoplastic layer adjacent a relatively cooler surface with the projections in heat transfer relationship with the relatively cooler surface to sufficiently solidify the projections.

2. The method of claim 1 wherein each body portion tapers toward a respective enlarged tip from a maximum diameter in the range of 1.2 to 2.5 millimeters to a minimum diameter in the range of 0.5 to 1.5 millimeters, and wherein each enlarged tip has a diameter in the range of 1 to 2.5 millimeters.

3. The method of claim 1 wherein the first platen has a first surface maintained at a temperature in the range of 40° F. to 120° F., and the heated surface of the second platen is maintained at a temperature in the range of 250° F. to 400° F., and wherein the step of compressing the cover layer and the thermoplastic layer between the first and second platens so as form enlarged tips on the projections comprises applying a compressive force in the range of 1 to 10 psi to the cover layer and the thermoplastic layer.

4. The method of claim 1 further comprising heating the mold and the thermoplastic layer, prior to the step of forcing the cover layer and the thermoplastic layer against the mold to form a plurality of projections, by positioning the mold between first and second platens of a first press such that the cover layer is disposed proximate the first platen, the first platen having a first surface maintained at a temperature in the range of 40° F. to 120° F., the second platen having a second surface maintained at a temperature in the range of 250° F. to 500° F., and applying a compressive force in the range of 10 to 50 psi to the cover layer, the thermoplastic layer and the mold by compressing the cover layer, the thermoplastic layer and the mold between the first and second platens of the first press.

5. The method of claim 4 wherein the step of heating the mold and the thermoplastic layer further comprises positioning the mold between first and second platens of a second press such that the cover layer is disposed proximate the first platen, the first platen having a first surface maintained at a temperature in the range of 40° F. to 120° F., the second platen having a second surface maintained at a temperature in the range of 250° F. to 500° F., and applying a compressive force in the range of 10 to 50 psi to the cover layer, the thermoplastic layer and the mold by compressing the cover layer, the thermoplastic layer and the mold between the first and second platens of second first press.

6. The method of claim 5 wherein the step of forcing the cover layer and the thermoplastic layer against the mold comprises positioning the mold between first and second platens of a third press, the first platen having a first surface maintained at a temperature in the range of 40° F. to 120° F., the second platen having a second surface maintained at a temperature in the range of 40° F. to 120° F., and applying a compressive force in the range of 50 to 180 psi to the cover layer, the thermoplastic layer and the mold by compressing the cover layer, the thermoplastic layer and the mold between the first and second platens of the third press.

7. A method of making a floor mat, the method comprising:

positioning a thermoplastic layer on a mold having a plurality of cavities for forming projections on the thermoplastic layer;

positioning the mold between first and second platens of a first press, the first platen having a first surface maintained at a temperature in the range of 40° F. to 120° F., the second platen having a second surface maintained at a temperature in the range of 250° F. to 500° F.;

applying a compressive force in the range of 10 to 50 psi to the mold and the thermoplastic layer by compressing the mold and the thermoplastic layer between the first and second platens of the first press so as to heat the thermoplastic layer to a first temperature;

positioning the mold between first and second platens of a second press, the first platen having a first surface maintained at a temperature in the range of 40° F. to 120° F., the second platen having a second surface maintained at a temperature in the range of 250° F. to 500° F.;

applying a compressive force in the range of 10 to 50 psi to the mold and the thermoplastic layer by compressing the mold and the thermoplastic layer between the first and second platens of the second press so as to heat the thermoplastic layer to a second temperature, which is at least as great as a molding temperature of the thermoplastic layer;

positioning the mold between first and second platens of a third press, the first platen having a first surface maintained at a temperature in the range of 40° F. to 120° F., the second platen having a second surface maintained at a temperature in the range of 40° F. to 120° F.;

applying a compressive force in the range of 50 to 180 psi to the mold and the thermoplastic layer by compressing the mold and the thermoplastic layer between the first and second platens of the third press so as to form a plurality of projections on the thermoplastic layer, each of the projections having an elongated body portion;

removing the thermoplastic layer from the mold;

positioning the thermoplastic layer between first and second platens of a fourth press, the first platen having a first surface maintained at a temperature in the range of 40° F. to 120° F., the second platen having a second surface maintained at a temperature in the range of 250° F. to 400° F.; and applying a compressive force in the range of 1 to 10 psi to the thermoplastic layer by compressing the thermoplastic layer between the first and second platens of the fourth press so as form enlarged tips on the projections.

8. The method of claim 7 wherein the step of applying a compressive force in the range of 50 to 180 psi to the mold and the thermoplastic layer by compressing the mold and the thermoplastic layer between the first and second platens of the third press includes applying the compressive force for no longer than about 30 seconds.

9. The method of claim 7 wherein each body portion tapers toward a respective enlarged tip from a maximum diameter in the range of 1.2 to 2.5 millimeters to a minimum diameter in the range of 0.5 to 1.5 millimeters, and wherein each enlarged tip has a diameter in the range of 1 to 2.5 millimeters.

10. The method of claim 7 further comprising positioning the thermoplastic layer in heat transfer relationship with a cooling platen having a surface maintained at a temperature in the range of 40° F. to 120° F., so as to sufficiently solidify the projections.

11. The method of claim 7 further comprising joining a cover layer to the thermoplastic layer.

12. A method of making a removable floor mat for covering a flooring system, the method comprising:
   positioning a thermoplastic layer on a mold having a cavity for forming a projection on the thermoplastic layer, the mold further having an escape passage for allowing air to escape from the cavity;
   heating the mold in a first press including a platen having a surface maintained at a first predefined temperature;
   transferring heat to the thermoplastic layer by contact with the heated mold under conditions sufficient to soften the thermoplastic layer without causing substantial flow thereof;
   causing a portion of the thermoplastic layer to flow into the cavity while maintaining the temperature at about an entrance of the escape passage below the molding temperature of the thermoplastic layer, thereby minimizing flow of thermoplastic material into the escape passage, so as to form a projection on the thermoplastic layer, the projection having an elongated body portion;
   heating the projection to sufficiently soften the projection; and
   compressing the thermoplastic layer sufficiently so as to form an enlarged tip on the projection, the enlarged tip being engageable with the flooring system.

13. The method of claim 12 wherein the temperature at about the entrance of the escape passage is maintained at least 20° F. below the molding temperature of the thermoplastic layer.

14. The method of claim 12 wherein the body portion tapers toward the enlarged tip from a maximum diameter in the range of 1.2 to 2.5 millimeters to a minimum diameter in the range of 0.5 to 1.5 millimeters, and wherein the enlarged tip has a diameter in the range of 1 to 2.5 millimeters.

15. The method of claim 12 further comprising joining a cover layer to the thermoplastic layer.

16. The method of claim 12 wherein the first predefined temperature is in the range of 250° F. to 500° F.

17. The method of claim 12 further comprising heating the mold in a second press after heating the mold in the first press, the second press including a platen having a surface maintained at a second predefined temperature, and transferring heat to the thermoplastic layer by contact with the further heated mold under conditions sufficient to soften the thermoplastic layer without causing substantial flow thereof.

18. The method of claim 17 wherein the second predefined temperature is in the range of 250° F. to 500° F.

19. The method of claim 17 wherein each of the first and second presses exerts a compressive force in the range of 10 to 50 psi.

20. The method of claim 17 wherein the step of causing a portion of the thermoplastic layer to flow into the cavity comprises compressing the thermoplastic layer in a third press.

21. The method of claim 20 wherein the third press exerts a compressive force in the range of 50 to 180 psi.

22. The method of claim 20 wherein the step of heating the projection comprises heating the thermoplastic layer in a fourth press.

23. The method of claim 22 wherein the fourth press includes a platen having a surface maintained in the range of 250° F. to 400° F.

24. The method of claim 22 wherein the step of compressing the thermoplastic layer comprises compressing the thermoplastic layer in the fourth press.

25. The method of claim 24 wherein the compressive force exerted by the fourth press is in the range of 1 to 10 psi.

26. The method of claim 24 further comprising positioning the thermoplastic layer in heat transfer relationship with a cooling platen having a surface maintained at a temperature in the range of 40° F. to 120° F., so as to sufficiently solidify the projection.

27. A method of making a removable floor mat for covering a flooring system, the method comprising:
   positioning a thermoplastic layer on a mold, the mold having a plurality of cavities for forming projections on the thermoplastic layer, the mold further having a plurality of escape passages extending from the cavities to an edge of the mold for allowing air to escape from the cavities;
   positioning a cover layer over the thermoplastic layer;
   positioning the mold between first and second platens of a first press such that the cover layer is disposed proximate the first platen, the first platen having a first surface maintained at a temperature in the range of 40° F. to 120° F., the second platen having a second surface maintained at a temperature in the range of 250° F. to 500° F.;
   applying a compressive force in the range of 10 to 50 psi to the mold, the thermoplastic layer and the cover layer by compressing the mold, the thermoplastic layer and the cover layer between the first and second platens of the first press so as to heat the thermoplastic layer to a first temperature without causing substantial flow of thermoplastic material into the cavities;
   positioning the mold between first and second platens of a second press such that the cover layer is disposed proximate the first surface, the first platen having a first surface maintained at a temperature in the range of 40° F. to 120° F., the second platen having a second surface maintained at a temperature in the range of 250° F. to 500° F.;
   applying a compressive force in the range of 10 to 50 psi to the mold, the thermoplastic layer and the cover layer by compressing the mold, the thermoplastic layer and the cover layer between the first and second platens of the second press so as to heat the thermoplastic layer to a second temperature without causing substantial flow of thermoplastic material into the cavities, wherein the second temperature is at least as great as a molding temperature of the thermoplastic layer;

positioning the mold between first and second platens of a third press, the first platen having a first surface maintained at a temperature in the range of 40° F. to 120° F., the second platen having a second surface maintained at a temperature in the range of 40° F. to 120° F.;

applying a compressive force in the range of 50 to 180 psi to the mold, the thermoplastic layer and the cover layer by compressing the mold, the thermoplastic layer and the cover layer between the first and second platens of the third press, while maintaining the temperature at entrances of the escape passages at least 20° F. below the molding temperature of the thermoplastic layer, thereby minimizing flow of thermoplastic material into the escape passages, so as to form a plurality of projections on the thermoplastic layer;

removing the thermoplastic layer and the cover layer from the mold;

positioning the thermoplastic layer between first and second platens of a fourth press such that the cover layer is disposed proximate the first platen and the thermoplastic layer is disposed proximate the second platen, the first platen having a first surface maintained at a temperature in the range of 40° F. to 120° F., the second platen having a second surface maintained at a temperature in the range of 250° F. to 400° F.;

applying a compressive force in the range of 1 to 10 psi to the thermoplastic layer and the cover layer by compressing the thermoplastic layer and the cover layer between the first and second platens of the fourth press so as form enlarged tips on the projections; and positioning the thermoplastic layer in heat transfer relationship with a cooling platen having a surface maintained at a temperature in the range of 40° F. to 120° F., so as to sufficiently solidify the projections.

28. The method of claim 27 wherein each body portion tapers toward a respective enlarged tip from a maximum diameter in the range of 1.2 to 2.5 millimeters to a minimum diameter in the range of 0.5 to 1.5 millimeters, and wherein each enlarged tip has a diameter in the range of 1 to 2.5 millimeters.

* * * * *